March 23, 1965  A. C. FOX ETAL  3,175,076
AUTOMATIC CONTROL SYSTEM FOR OIL WELL HEATER
Filed Oct. 5, 1961
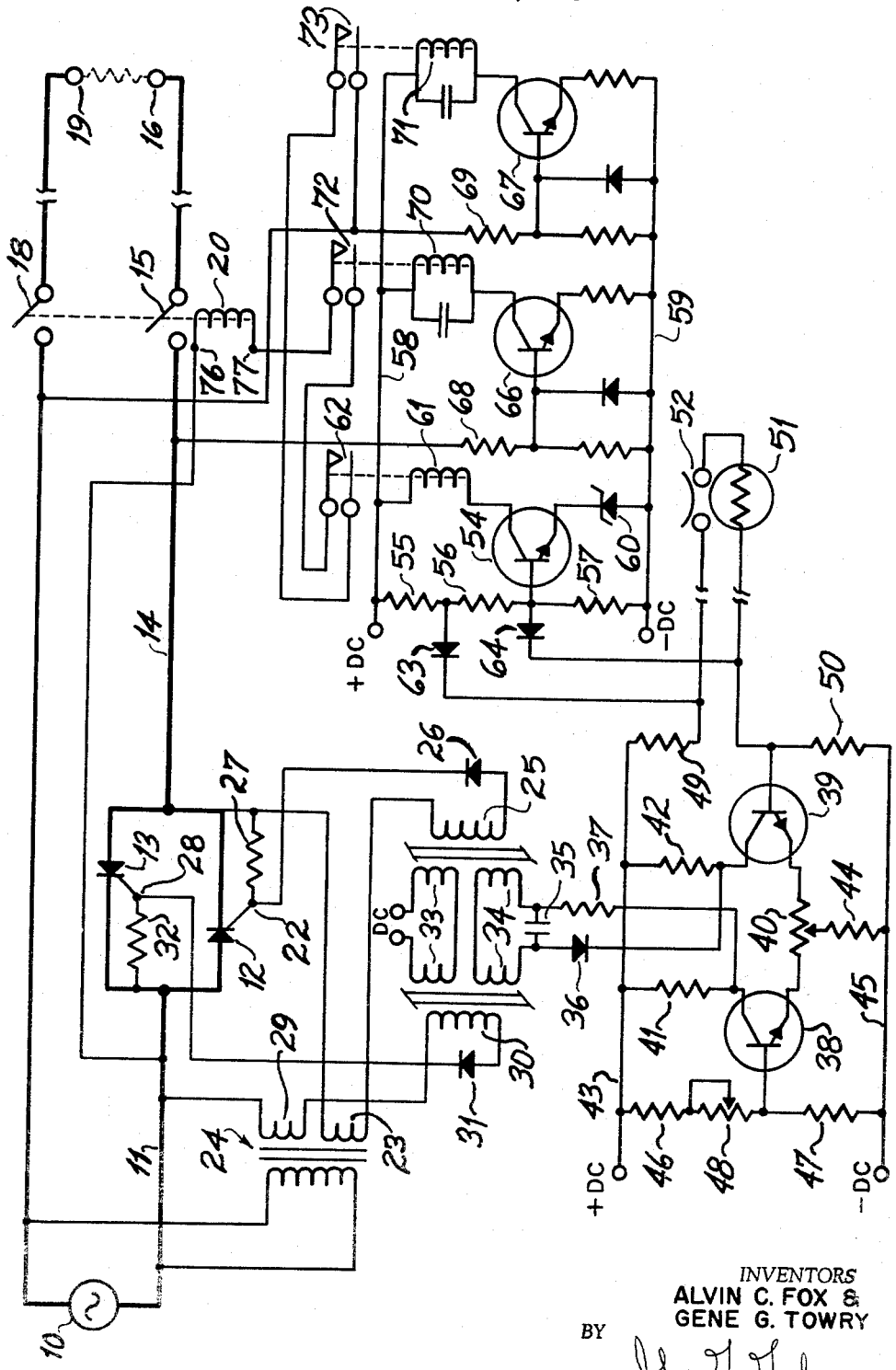
INVENTORS
ALVIN C. FOX &
GENE G. TOWRY
BY John G. Graham

United States Patent Office 3,175,076
Patented Mar. 23, 1965

3,175,076
AUTOMATIC CONTROL SYSTEM FOR
OIL WELL HEATER
Alvin C. Fox and Gene G. Towry, both of Dallas, Tex., assignors to Texas Instruments Incorporated, Dallas, Tex., a corporation of Delaware
Filed Oct. 5, 1961, Ser. No. 143,240
1 Claim. (Cl. 219—494)

This invention relates to a temperature control system for an electrical heater of the type utilized in oil wells and more particularly to a control system for an oil well heater which is adapted for automatic shut-down upon occurrence of failure of one of the system components.

The rate of production of an oil or gas well may be sometimes greatly increased by melting the accumulated paraffin and low viscosity oil in the region of flow. As set forth in our copending application Serial No. 143,241, filed October 5, 1961, this may be accomplished by dropping an electrical heater into the well, the heater merely taking the form of a pair of spaced electrodes. The saline liquid within the well provides a path for current flow and so provides the heater resistance between the electrodes. Large values of current are necessary to provide heating in this manner and the current must be closely controlled in response to the well temperature. If the temperature is too low the process will be ineffective, while if the temperature is allowed to rise too high there may be detrimental effects on the petroleum products or vaporization of the liquids in the well. This system would be ordinarily utilized in remote areas which might be seldom visited by operators. Accordingly, it is especially important that the system not only maintain the proper temperature range within the well, but also that it be quite reliable and have "fail safe" features which turn the system off upon the occurrence of a malfunction.

It is the principal object of this invention to provide temperature control system for an oil well heater of the type adapted for automatic operation in remote areas. Another object is to provide a heater control system having automatic shut-down features which operate in response to failure of various components of the system.

In accordance with this invention a pair of oil well heater electrodes are connected to an A.C. source through a pair of silicon controlled rectifiers. The controlled rectifiers are connected back-to-back so that an alternating voltage appears across the heater electrodes, the conduction of the rectifiers in each half cycle being determined by the firing angles. The gate electrodes of the rectifiers are driven by a saturable reactor arrangement which provides triggering pulses variable over each half cycle in response to the output of a differential amplifier. The input of the differential amplifier includes a pair of temperature-sensitive elements located in the well. One of the elements is variable in resistance according to temperature and the other is adapted to open the circuit at a certain high temperature. A contactor is located in circuit of the heater and is adapted to open the heater circuit when one of the temperature control elements is shorted, opened or grounded, or else upon failure of one of the controlled rectifiers. Also the contactor opens the heater circuit whenever a component of the fault detector circuit itself fails.

The novel features believed characteristic of this invention are set forth in the appended claim. The invention itself, however, along with further objects and the advantages thereof, may best be understood by reference to the following detailed description, when read in conjunction with the accompanying drawing, wherein the single figure is a schematic diagram of the electrical circuit of the oil well heater control system of this invention.

With reference to the figure of the drawing, the temperature control system includes an alternating current source 10 which may comprise an isolation transformer connected to the local A.C. distribution line. One side of the source 10 is connected by a line 11 to the anode of a silicon controlled rectifier 12 and to the cathode of a silicon controlled rectifier 13. The other anode and cathode of the pair of controlled rectifiers 12 and 13 are connected together and to a line 14 which is connected through relay contacts 15 to an electrode 16 which forms part of the oil well heater. The other terminal of the source 10 is directly connected by a line 17 through relay contacts 18 to the other electrode 19 of the oil well heater. The relay contacts 15 and 18 are operated by a a coil 20, and it is seen that when the coil 20 is energized the contacts 15 and 18 are closed and the source voltage will appear across the terminal 16 and 19, to the extent that the controlled rectifiers 12 and 13 are conductive, of course.

The firing angles of the controlled rectifiers 12 and 13 are controlled in response to the well temperature by a circuit which may include a saturable reactor arrangement driven by a differential amplifier. Thus, a gate electrode 22 of the controlled rectifier 12 is connected to the cathode of the rectifier by the external circuit which includes a secondary winding 23 on a transformer 24 along with a winding 25 on a saturable reactor arrangement. The transformer 24 includes a primary connected across the source 10, and so provides an alternating voltage on the secondary 23 which is in phase with the line voltage. The impedance of the winding 25 will be very high before the core is saturated and very low thereafter so that the voltage appearing on the control electrode 22 will be virtually zero until after the core of the winding 25 saturates. Upon saturation a current pulse is provided to the gate 22 through a diode 26 to fire the controlled rectifier. A resistor 27 shunts the gate 22 to the cathode circuit. In a like manner a gate electrode 28 of the other controlled rectifier 13 includes an external gate-to-cathode circuit comprising a secondary winding 29 on the transformer 24 and an output winding 30 on the saturable reactor. This winding is connected through a diode 31 to the gate 28 while the gate is shunted to the cathode by a large resistor 32.

The saturable reactor cores are controlled by a fixed bias plus a bias which is variable in response to well temperature. A bias winding 33 on the saturable reactor is driven by a constant direct current which may be derived by a rectifier arrangement from the source 10. This bias current is sufficient to reset the cores of the saturable reactor after each half cycle in the absence of further bias current. Control windings 34 are also adapted to bias the cores, this being in response to the temperature in the well. In this manner the point in each half cycle at which the cores saturate may be controlled and thereby the firing angle of the controlled rectifiers determined. A smoothing capacitor 35 is connected across the terminals of the winding 34. One of these terminals is connected through a diode 36 to one output of a differential amplifier while the other terminal is connected through a resistor 37 to the remaining output point of the differential amplifier.

The differential amplifier comprises a pair of transistors 38 and 39 having a common emitter resistance 40 and separate collector load resistors 41 and 42 connected to a positive supply line 43, while the common resistor 40 is connected through a resistor 44 to a negative D.C. line 45 or ground. A preselected bias is applied to the base of the transistor 38 by a voltage divider arrangement including fixed resistors 46 and 47 and a variable resistor 48. This variable resistor is effective to select the temperature range of the control system by determining the balance condition of the differential amplifier. The base of the other transistor 39 is biased by a voltage divider arrangement connected between the lines 43 and 45 including fixed resistors 49 and 50 and two temperature-sensitive elements which are located in the well. These elements include a temperature-sensitive resistor 51 such as a Texas Instruments "Sensistor," and a thermostatic switch 52 such as a Texas Instruments "Klixon" control device.

The temperature sensing devices 51 and 52 will of course be located at the bottom of the well and connected to the differential amplifier input by perhaps 2000 feet of conductor. Accordingly, there is considerable possibility that the connecting cable may become open, shorted or grounded, rendering the temperature control inoperative and possibly allowing the well temperature to increase far beyond the permissible range. Thus it is necessary that the heater be disconnected from the source upon the occurrence of either of these conditions. To provide this function, a transistor 54 is connected to be normally conductive due to a voltage divider biasing arrangement including resistors 55, 56 and 57 connected between a positive supply line 58 and a negative D.C. supply line 59 or ground. The emitter of the transistor 54 is connected to the line 59 by a zener diode 60 while the collector is connected to the line 58 through a relay coil 61. So long as the transistor 54 is conductive the coil 61 holds a pair of contacts 62 closed. The junction of the resistors 55 and 56 is connected to one side of the resistor 49 by a diode 63 so that if the lines connected to the elements 51 and 52 should become shorted or grounded the diode 63 will conduct and lower the bias on the transistor 54 so that it will become nonconductive. In a like manner the junction of the resistors 56 and 57 is connected to the base of the transistor 39 by a diode 64 so that if the lines connected to the elements 51 and 52 become opened or grounded the base bias of the transistor 54 will be lowered and render the transistor nonconductive, allowing the contacts 62 to open.

The conductors leading to the heater electrodes 16 and 19 likewise lead down into the well and are perhaps 2000 feet in length. If these conductors should be shorted or grounded at any point along the length, then the control system should be disconnected therefrom to prevent damage to the well casing or to the control system itself. Also, if one of the controlled rectifiers 12 or 13 fails, then direct current would be supplied to the heater. This is highly undesirable since an electrolysis effect would be produced in the well, resulting in severe corrosion. Thus, the heater must be disconnected whenever either of these conditions occur. To provide this function a pair of transistors 66 and 67 are utilized, each having the base electrode connected to one of the lines 14 and 17 through one of a pair of resistors 68 and 69. The base electrodes are further connected to the negative D.C. line 59 through diodes to clip off the negative half cycles and resistors to maintain the proper bias level. The emitters of the transistors 66 and 67 are connected to the line 59 through resistors while the collectors are connected to the line 58 through relay coils 70 and 71. These relay coils are adapted to maintain sets of contacts 72 and 73 in a closed position so long as the transistors 66 and 67 are conducting. If the potential on one of the lines 14 or 17 dropped, however, one of the transistors 66 or 67 would be cut off, allowing the corresponding relay contacts 72 or 73 to open.

The relay coil 20 has one terminal 76 directly connected to the line 11 while the other terminal 77 is connected to the line 17 through the contacts 72, 62 and 73. Accordingly, the coil 20 will be energized only when the contacts 72, 62 and 73 are closed, or when the transistors 54, 66 and 67 are conducting.

In the operation of the system described above, it is seen that the source 10 will be connected across the heater electrodes 16 and 19 when the relay coil 20 is energized and for a percentage of each half cycle as determined by the firing angles of the controlled rectifiers 12 and 13. These firing angles are first selected according to the desired well temperature which is determined by the setting of the potentiometer 48. The temperature within the well will determine the resistance of the element 51, and if it is less than desired the voltage on the base of the transistor 39 will tend to be high, increasing the conduction thereof and decreasing the collector voltage. Increased emitter current will tend to cut off the other transistor 38 due to the common emitter resistor, and this will raise the voltage on the collector. Current will therefore flow through the winding 34 in the direction permitted by the diode 36. This current will oppose the bias current in the winding 33 and decrease the amount by which the cores of the saturable reactor are reset after each half cycle. Accordingly, the voltages impressed on the windings 25 and 30 by the secondary windings 23 and 29 will saturate the cores before the end of each half cycle and will thus apply starting pulses to the gates of the controlled rectifiers 12 and 13 which will conduct and supply heating current to the electrodes 16 and 19. If the well temperature is too high, on the other hand, the resistance of the element 51 will be high and the differential amplifier will be unbalanced in the other direction. The collector voltage of the transistor 39 will be positive with respect to that of the transistor 38, but no current will flow through the winding 34 due to the diode 36. In this condition, the cores will be reset each cycle, no firing pulses appear on the gates 22 and 28, and no heater current will flow.

The coil 20 is energized only when all three of the contacts 62, 72 and 73 are closed. As explained above, the transistors 54, 66 and 67 are biased to be normally conductive and will cut off when some fault occurs, de-energizing the coil 20 and allowing the contacts 15 and 18 to open. The transistor 54 will cut off when one of the elements 51 or 52, or the leads thereto, become open, shorted or grounded. The transistors 66 and 67 will cut off when one of the lines 14 and 17 drops in voltage, such as would occur if one of the controlled rectifiers opened or one of the lines leading to the heater electrodes became grounded. Also, when the well gets up to temperature, the semiconductor controlled rectifiers will cut off. The voltage on the lines will drop, and the contactors will open.

While this invention has been described with reference to a specific embodiment, this description is not meant to be construed in a limiting sense. It is of course understood that various modifications of this invention may be made by persons skilled in the art, and so it is contemplated that the appended claim will cover any such modifications as fall within the true scope of the invention.

What is claimed is:

A temperature-controlled current supply system for an oil well heater comprising an alternating current source, a pair of controlled rectifiers connected back-to-back, said source and said controlled rectifiers being connected in a series circuit, said heater being connected across said series circuit by a first pair of conductors leading down into the well, switching means having contacts in said conductors adjacent said series circuit, saturable reactor means having a pair of separate cores, a fixed bias winding and a variable bias winding surrounding both of said cores, a pair of output windings linking said cores separately, said output windings being connected separately to the gates of said controlled rectifiers through separate alternating current sources, a fixed bias source connected to said fixed bias winding, a differential amplifier having an output connected to said variable bias winding and having a pair of input terminals, temperature responsive means located within the well in the region of said heater and connected to said pair of input terminals by a second pair of conductors leading down into the well, first, second and third transistor amplifier stages adapted to operate said switching means and biased normally conductive, a pair of diodes separately connecting the input of said first amplifier stage to said pair of input terminals whereby said first amplifier stage is cut off when the voltages on said pair of input terminals fall below given values, and means separately connecting the inputs of said second and third amplifier stages across said series circuit whereby said second and third amplifier stages are cut off when the voltage on either of said pair of conductors falls below a given value.

References Cited by the Examiner
UNITED STATES PATENTS

| | | | |
|---|---|---|---|
| 2,691,732 | 10/54 | Boyd et al. | 219—10.77 |
| 2,752,473 | 6/56 | Hage | 219—497 |
| 2,872,556 | 2/59 | Obermaier | 219—499 |
| 2,960,593 | 11/60 | Kohler | 219—10.77 |
| 3,040,158 | 6/62 | Cutler et al. | 219—210 |
| 3,076,924 | 2/63 | Manteuffel | 323—76 |

RICHARD M. WOOD, *Primary Examiner.*